United States Patent [19]

Tatsuno

[11] Patent Number: 4,870,604
[45] Date of Patent: Sep. 26, 1989

[54] PORTABLE DATA PROCESSING DEVICE
[75] Inventor: Hiyoshi Tatsuno, Tokyo, Japan
[73] Assignee: Tokyo Tatsuno Co., Ltd., Tokyo, Japan
[21] Appl. No.: 49,198
[22] Filed: May 13, 1987
[30] Foreign Application Priority Data
  May 15, 1986 [JP] Japan .................. 61-111380
  May 16, 1986 [JP] Japan .................. 61-113265
[51] Int. Cl.4 ............................. G06F 15/02
[52] U.S. Cl. .................... 364/708; 235/380
[58] Field of Search ............. 364/708; 235/380, 494
[56] References Cited
U.S. PATENT DOCUMENTS 4,087,680  5/1978  Mach et al. ............ 235/449
  4,523,297  6/1985  Ugon et al. ............ 235/380
  4,602,351  7/1986  Shimamura et al. ...... 365/52
  4,705,211 11/1987  Honda et al. .......... 235/380
  4,719,338  1/1988  Avery et al. .......... 235/380
  4,724,310  2/1988  Shimamura et al. ...... 235/483

FOREIGN PATENT DOCUMENTS 60-246467 12/1985  Japan .................. 364/708
  62-44891  2/1987  Japan .
  2124420  2/1984  United Kingdom .

Primary Examiner—Gary V. Harkcom
Assistant Examiner—Tan V. Mai
Attorney, Agent, or Firm—Sughrue, Mion, Zinn, Macpeak & Seas

[57] ABSTRACT

Portable data processing device cooperating with an IC card and having a casing body housing a contact head to be connected with the integrated circuit (IC) card when the latter is incorporated with the device, data processing device and an electric source therein, and a lid hingedly attached to the casing body so as to be angularly movable between an open position and a closed position. The lid has a pocket in which the IC card is lodged and a key board arranged on the outer surface thereof.

8 Claims, 5 Drawing Sheets

PORTABLE DATA PROCESSING DEVICE

BACKGROUND OF THE INVENTION

This invention relates to a portable and hand-held device for data processing by means of an IC storage in the form of a card, and more particular to such device to be conveniently used e.g. by an owner of the IC storage card as a credit card, cash card, identification card and the like in order to confirm data stored therein e.g. by a salesman, a delivery worker and the like for his operation, namely temporarily writing dealing data in the IC card on the spot which is called the point of sales system.

The IC storage card, which has a plurality of contact points or conductive terminals exposed to be flush with the surface of one side thereof and electrically connected with a memory circuit and a central processing unit respectively embedded in the card made of plastics, has far more memory capacity and is safer against stored data tapping in comparison with the magnetic card so that such IC card is going to be widely used for a variety of purposes such as a cash card, credit card, identification card involving not only informations necessary for identifying the owner but also other informations such as his blood type, clinical histories etc.

In order to read stored data out of and write new data in such an IC card, the conductive terminals of the card as external memory must be electrically connected with concerned terminals of a computer.

For the purpose of convenient and reliable electrical connection for reading/writing, various devices called IC card reader/writer, which comprises at least a pocket for receiving and holding the IC card, a contact head having contact pins to be electrically engaged respectively with the contact points of the loaded card, and conductive terminals electrically connected respectively with the contact pins so as to be electrically connected with the computer, have been proposed (e.g. see U.S. Pat. Nos. 4,087,680 and 4,602,351; U.S. patent application Ser. No. 747,148; UK Patent Application No. 2,124,420). Such devices are naturally mounted on a general computer of a large scale, an office computer of a small scale or a so-called personal computer of a further smaller scale, or located in the vicinity of such computer to be electrically connected as occasion demands.

Meanwhile, the owner of the IC card for instance as the credit card will often wish to confirm the information stored therein, such as a remainder of the credited sum and the past transactions, but for that purpose he must take the trouble to go to the concerned banking institution. Thus, it is desirable for the IC card owner to possess a compact device provided with a display of e.g. liquid crystal or light emission diode type, a key board of ten keys and some additional keys for inputting identification numbers so as to allow the stored data to appear on said display and a microprocessor in addition to said IC card reader/writer.

It is desirable also for a salesman, delivery worker of the wholesaler and the like to possess such compact and hand-held device in order to write a kind, quantity, unit cost etc. of the delivered or sold articles and a sum in the IC card to be temporally stored and later read by or stored in the computer in his office to be variously processed.

DESCRIPTION OF RELATED ART

Japanese Unexamined Patent Application Gazette Sho-60 (1985)-220482 laid early open on Nov. 5, 1985 discloses such a data processing device which comprises a box-like casing having a pocket for receiving and holding an IC card in a plane parallel to the upper and bottom walls by manually inserting it from an inlet slot formed at one of the end walls, a contact head provided with vertically protruded contact pins so as to electrically engage with counterpart contact points of the loaded IC card, and a microprocessor therein as well as a key board for inputting identification numbers and a display on the upper wall. However, this device has defects in that the contact pins urged to protrude by spring means are apt to be worn or even broken when manually inserting the card in and pulling it out of the pocket in the horizontal direction, and consequently electrical engagement is not and comes not to be reliable.

Japanese Unexamined Patent Application Gazette Sho-62 (1987)-44891 laid early open on Feb. 26, 1987 also discloses such a data processing device which comprises a casing having a keyboard and a display on the upper wall thereof, and housing a contact head and a microprocessor therein. The so-called IC card reader/writer according to the application is in the form of a pocket member hinged at the bottom wall of the casing to be pivotally movable between a normal closed position and an open position for loading and unloading the IC card so that when the card is loaded and the member is brought in the closed position the contact points of the loaded card may contact respectively with the contact pins of the head mounted in the casing. This device thus may overcome the defect of the first prior art but has a defect in that it is troublesome for the user to turn the bottom up every loading and unloading of the card, which can not be neglected in the busy operation for the point of sales system.

SUMMARY OF THE INVENTION

It is thus an object of the invention to provide an improved portable and hand-held data processing device relative to the art referred to above, and to be convenient to handle.

It is another object to provide such a data processing device with means for securing reliable reading and writing so as to be used under busy circumstances.

DESCRIPTION OF THE PREFERRED EMBODIMENTS

Figure 7:
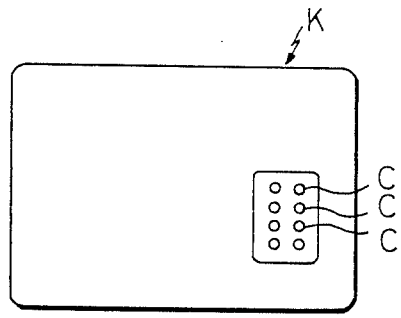
FIG. 7 is a plan view of an IC card to be used for the invention.

FIG. 7 shows a typical data storage card K often called IC card of a rectangular shape, a size suitable to be portable and made of any suitable plastics. The card K has a plurality of contact points C, eight in this example, exposed on one side thereof to be flush with the surface and connected to respective portions of a memory circuit (not shown) and further to a central processing unit (not shown) respectively embedded therein.

Figure 1:
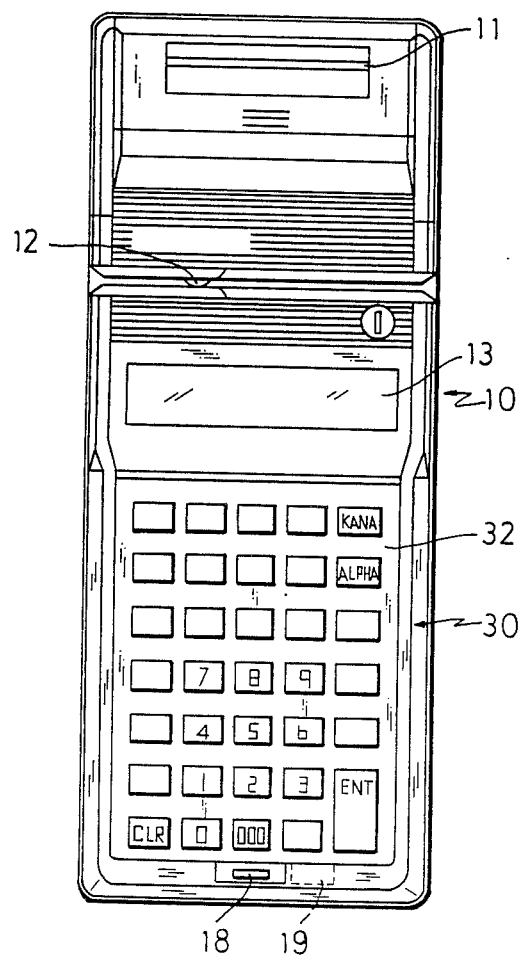
FIG. 1 is a plan view of the data processing device according to the invention.
Figure 2A:
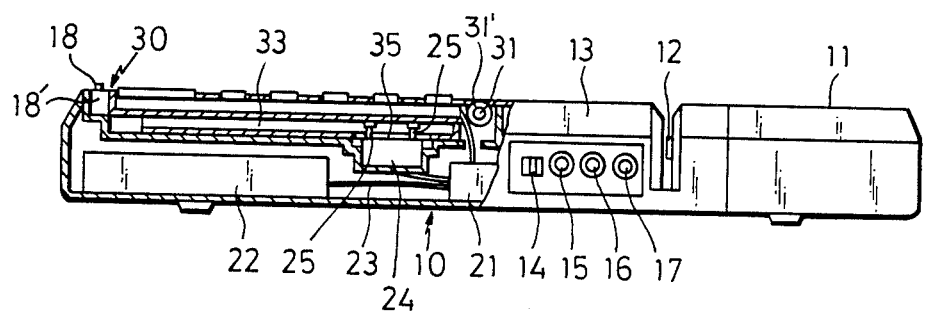
FIGS. 2A and 2B are side elevations of the above partly in section shown respectively in a normal close position and in an open position for loading and unloading of the IC card.
Figure 2B:
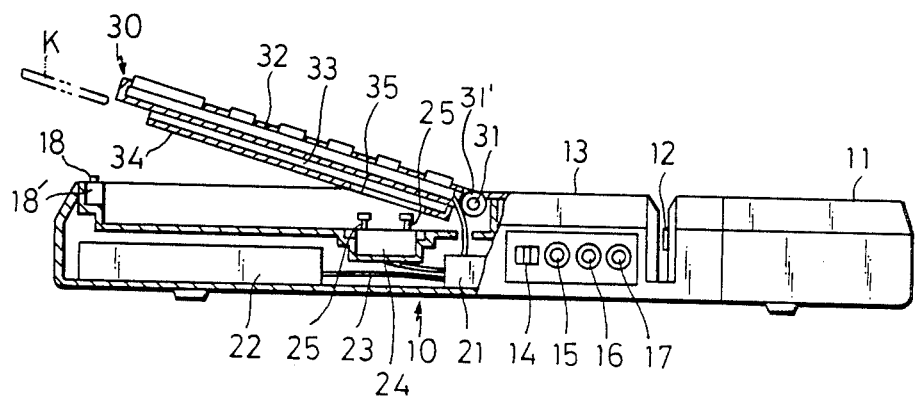

Now in reference to FIG. 1, FIGS. 2A and 2B, in which the data processing device of the invention has a casing body generally represented by 10 of the width suitable to be held by one hand of the user and housing a data processing means 21 and a secondary battery 22 which are connected with a conductor 23.

The casing body 10 has a printer 11, a magnetic head 12 for reading a magnetic card and a display 13 on the top wall, although the former two are not always indispensable for the invention. The casing has a main switch 14, a terminal 15 for charging of the battery 22, a POS terminal 16, and a terminal 17 to a host computer at one of the side walls.

There is further housed a contact head 24 in the casing 10, in which contact pins 25 of the number and arrangement corresponding to the contact points C of the card K are planted to vertically protrude, preferably urged respectively by spring means not shown.

A lid represented generally by 30 is hinged 31 to the housing 10 to be angularly movable between the position shown in FIG. 2A and the position shown in FIG. 2B. A spring 31' is arranged at the hinged portion so as to urge the lid 30 toward the open position. A key-board 32 having ten keys and some additional keys necessary for inputting identification numbers and commands for e.g. the remainder sum stored in the IC card K as a credit card to appear on the display 13 or dealing data for the point of sales system is mounted on the outer surface of the lid 30, which has a pocket 33 formed by the inner surface of the lid 30 and an additional board 34 which has a window 35 so that the IC card K may be inserted and held in the pocket 33 when the lid 30 is in the open position as shown in FIG. 2B and that the contact points C of the loaded IC card may contact through the window 35 with the contact pins 25 of the contact head 24 when the lid 30 is brought in the closed position as shown in FIG. 2A.

It is preferable to provide click lock means 18 on the casing body 10 so as to secure the lid 30 having the pocket 33 formed on the inner surface thereof and the keyboard 32 on the outer surface thereof to be in the closed position. The click lock 18 may be adapted to be disengaged, for instance, by pushing a head thereof against spring means not shown so that the lid 30 is automatically opened to be in the open position owing to the spring means 31'. At the vicinity of the click lock, there is preferably arranged a detector 19, for instance in the form of a microswitch for detecting that the lid 30 is in the closed position to provide a corresponding signal to a microprocessor 21b so that the latter actuates other lock means 18' for preventing the lid 30 from being accidentally opened even if the head of the lock 18 should be pushed in error during the data processing operation. This is explained later in more detail in reference to FIG. 6.

Figure 3:
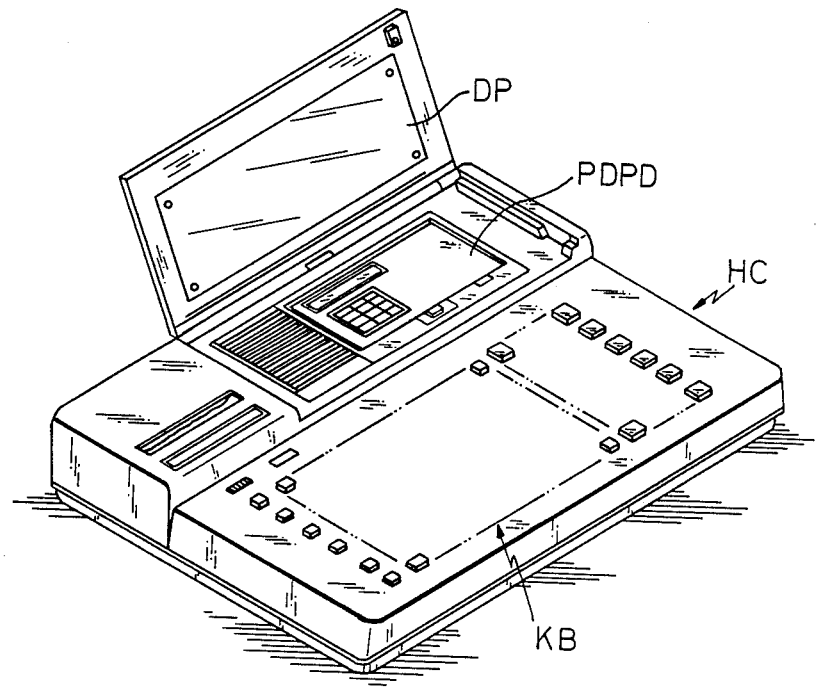
FIG. 3 is a perspective view of a computer in which the second embodiment of the data processing device of the invention is removably combined as a part of the assembly.

In FIG. 3 there is illustrated a portable data processing device PDPD according to the second embodiment of the invention, which is removably mounted as a part of the assembly in a host computer HC, in which a key-board KB and a display DP of the computer are roughly illustrated.

Figure 4:
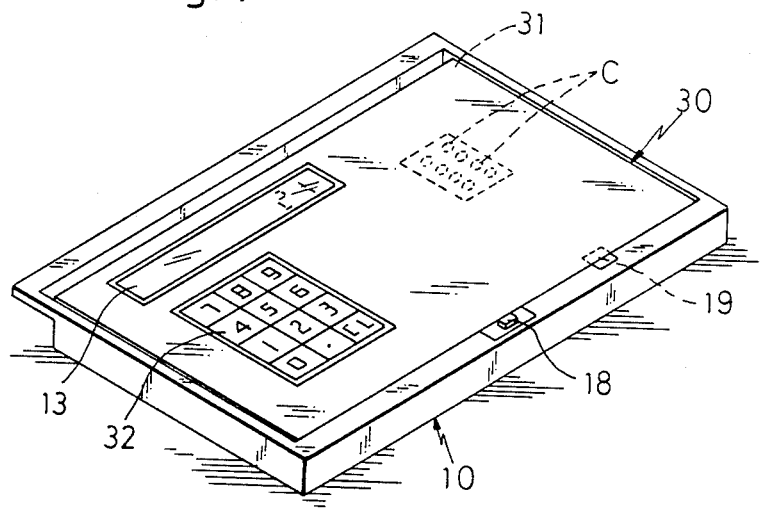
FIG. 4 is a perspective view of the daid processing device only.
Figure 5A:
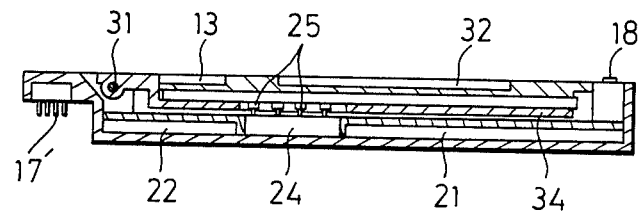
FIGS. 5A and 5B are side sectional views of the above shown respectively in a normal closed position and in an open position.
Figure 5B:
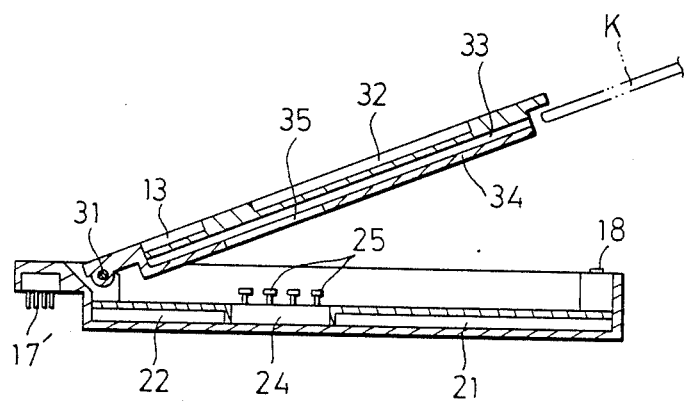

As seen from FIG. 4, FIGS. 5A and 5B showing the portable processing device only removed from the computer, the arrangement of the members and the construction are almost the same with those of the first embodiment so that the same reference numerals are used for the similar members in the drawings but the explanation will be omitted.

In this embodiment, the display 13 is arranged on the surface not of the casing body 10 but of the lid 30, which is also hinged 31 on the casing body 10, together with the key-board 32.

The conductive terminal 17' is so arranged that when the data processing device is assembled in the counter part computer HC, the terminal may be engaged with a socket (not shown) of the computer.

This portable data processing device PDPD is useful also as an interface for the computer which can not cope with identification numbers of the IC card. For instance when the IC card is used as a cashing card or credit card, the card owner mounts his data processing device on the computer provided at a counter of the concerned banking institution or a vender machine or loads the IC card in the pocket of the device already mounted on the computer and actuates the keys on the board 32 for inputting his identification numbers in accordance with the given instructions. After the microprocessor 21b has judged that the card is acceptable, then he actuates the keys of the board KB of the computer for the desired transaction.

Figure 6:
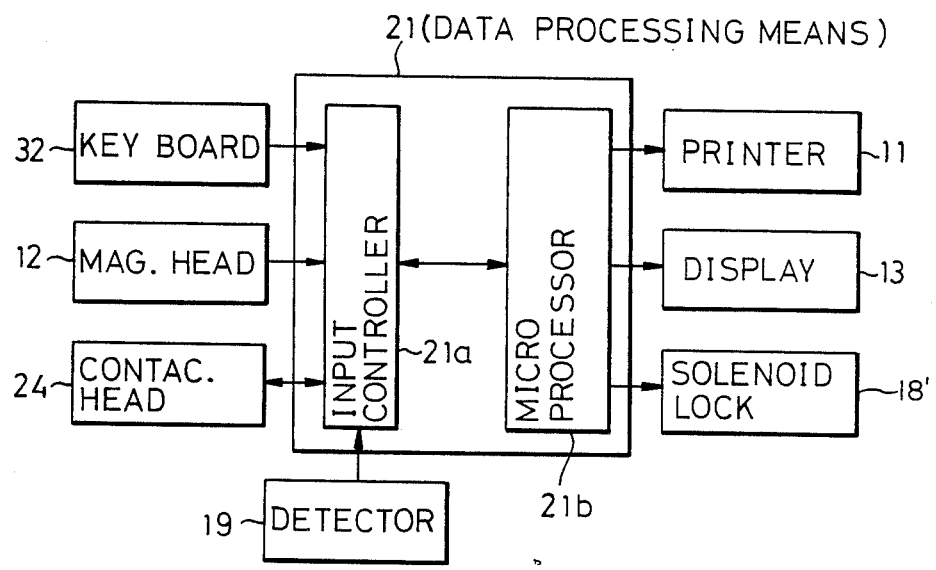
FIG. 6 is a block diagram illustrating an example of operation of the device of the invention.

Now in reference also to FIG. 6, when the main switch is actuated to be ON, an input controller 21a of the data processing means 21 comes to allow data input from the key-board 32, the magnetic head 12 and the IC card (the contact head 24) to the microprocessor 21b.

However, when the lid 30 is open by pushing the button 18 from the normal position (FIGS. 2A, 5A) to the open position (FIGS. 2B, 5B), the detector 19 turns the controller to prohibit the input. The IC card may be loaded in the pocket 33 in this lid position.

When the lid 30 is shut, the input is again made possible so that, for instance, the deliverer or the salesman may input dealing data and if necessary output the data by the printer 11 for handing the printed slip as a receipt or delivery statement. Or the owner of the IC credit card may input his identification numbers by actuating concerned keys to confirm e.g. the remainder sum appearing on the display 13.

A solenoid lock 18' is adapted to be actuated to prohibit actuation of the button 18 during the operations and deenergized when operation is over to allow actuation of the lock button 18.

What is claimed is:
1. A portable data processing device comprising:
   a casing body housing a contact head, data processing means and an electric source therein;
   a lid hingedly attached to said casing body so as to be angularly movable between an open position and a closed position, said lid being provided, on an inner side thereof, with a pocket for loading an integrated circuit (IC) card of the type having contact points exposed on one side thereof to be flush with the surface, the integrated circuit (IC) card being loaded in said pocket when said lid is moved to the open position, and the loaded (IC) card being electrically connected with the contact head for data processing when the lid is turned to the closed position;

a keyboard mounted on the outer surface of the lid;

locking means for securing the lid in the closed position, the locking means being manually operated for unlocking;

a detector for detecting when the lid is in the closed position to generate a signal to the data processing means; and a solenoid for holding the lid in the closed position when receiving a signal from the data processing means during at least one of a reading and writing operation, the solenoid being deenergized in reply to a signal from the data processing means after the completion of the at least one of a reading and writing operation to allow the lid to be turned to the open position when the locking means is manually operated.

2. The portable data processing device as set forth in claim 9, in which said contact head has contact pins of a number and an arrangement to those of contact points of said IC storage card and is mounted in said casing body so that said contact pins are protruded toward said lid and said pocket is formed by the inner surface of said lid and an additional board so as to receive and hold said IC card therebetween, said additional board having a window formed therein so that said contact points of the card loaded in said pocket respectively engage with said contact pins through said window when said lid is brought in said closed position.

3. The portable data processing device as set forth in claim 1, in which a display is mounted on the casing upper wall.

4. The portable processing data as set forth in claim 1, in which a display is mounted on the outer surface of the lid.

5. The portable data processing device as set forth in claim 1, in which said casing body is of such a width as to be held by one hand of the user.

6. The portable data processing device as set forth in claim 1, in which said lid is held in said second position during data processing operation in reply to a signal from said data processing means.

7. The portable data processing device as set forth in claim 6, in which said lid is held in said closed position by means of a solenoid energized or deenergized in reply to said signal.

8. The portable data processing device as set forth in claim 1, in which there is provided a detector for detecting that said lid is in said closed position to generate a signal to said data processing means for reading and writing.

* * * * *